E. F. J. BREUER.
HOSE COUPLING.
APPLICATION FILED AUG. 31, 1916.

1,230,854.

Patented June 26, 1917.

Inventor
Erich F. J. Breuer.

UNITED STATES PATENT OFFICE.

ERICH F. J. BREUER, OF DECATUR, ILLINOIS.

HOSE-COUPLING.

1,230,854.          Specification of Letters Patent.     Patented June 26, 1917.

Application filed August 31, 1916.   Serial No. 117,846.

*To all whom it may concern:*

Be it known that I, ERICH F. J. BREUER, a citizen of the United States, residing at Decatur, in the county of Macon and State of Illinois, have invented certain new and useful Improvements in Hose-Couplings, of which the following is a specification.

The present invention relates in general to hose couplings, and relates more particularly to that class which does not necessitate the use of a washer for making a water-tight connection.

Heretofore it has been the practice to employ a hose coupling which is adapted to be received in the ends of the hose to be connected, one half of which is provided with male threads and the other half with a swiveled interiorly-threaded collar which is adapted to engage the threads of the other half and hence secure the hose coupling together. In this arrangement it is impossible to secure a water-tight connection without the use of a washer.

In my present invention I propose to eliminate the washer and at the same time secure a water-tight connection.

An object of my invention is to provide a hose coupling which employs one of the meeting ends of the hose in order to maintain a water-tight connection.

Another object of my present invention is to provide a hose coupling which employs the end of the conventional rubber hose, as a means for maintaining a water-tight connection, in such a manner that it will co-act with the conventional hydrants and existing hose couplings without alteration.

A further object of my invention is to provide a hose coupling of the class described, which can be easily secured to the meeting ends of the hose.

A still further object of my invention, is to provide a hose coupling in which the flow of water there-through will be substantially unobstructed.

For a more detailed description of my present invention, reference should now be had to the accompanying drawings, in which:—

Figure 1:
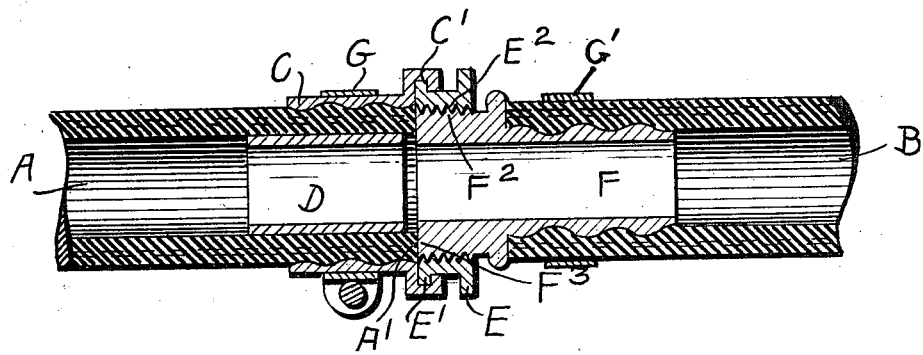
Figure 2:
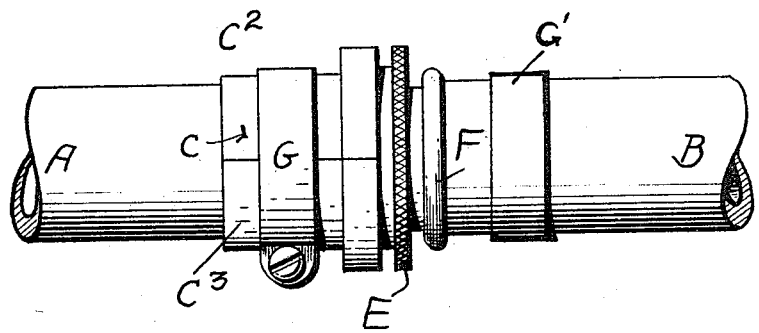

Figure 1 is a longitudinal, sectional view through a hose coupling constructed in accordance with an embodiment of my present invention, and Fig. 2 is a view in side elevation of the construction shown in Fig. 1.

Referring in detail to the drawing, A and B indicate the meeting ends of a pair of hose to be connected. F indicates the male portion of a conventional hose coupling which is adapted to be inserted into the hose B, is held therein by the clamping ring $G^1$, and constitutes no part of the present invention other than its association therewith. D indicates a sleeve adapted to be received into the hose A in a manner to prevent the collapse of the hose A, when the clamping sleeve C is clamped therearound. One end of the clamping sleeve C is provided with an interiorly presented groove $C_1$ forming an axial abutment. Within this groove is adapted to be received the rib $E_1$, of the collar E whereby the collar E will be held against axial movement, but will be free to rotate relative to the hose A. The inner periphery of the collar E is provided with screw threads $E_2$ which are adapted to co-act with the threads $F_2$ of the male portion of the coupling.

Preferably, the clamping sleeve C is constructed in half sections $C_2$ and $C_3$ in a manner that it can be easily assembled upon the hose A and the collar E, by the clamping ring G.

I also prefer that the smallest diameter of the sleeve C will be that which is adapted to co-act with the hose A, thus, the end of the hose A will be free to receive the abutting edge $F_3$ of the male coupling member F.

By this construction, it is evident that when the abutting edges $A_1$ and $F_3$ are brought into abutment by means of the screw threads $E_2$ of the collar E and the screw threads $F_2$ of the male portion of the coupling, a water-tight joint will be maintained at all times without the use of any washers whatsoever.

It is obvious that in a hose coupling of this nature there will be a direct lateral thrust upon the end of the hose forming the water-tight joint. This feature is very much desired in a hose coupling of this class, since it prevents the laceration or destruction of the hose, due to continuous coupling and uncoupling.

From the foregoing description, it is thought to be obvious that a hose coupling constructed in accordance with my present invention is of an extremely simple and comparatively inexpensive nature, and is particularly well adapted for use by reason of the convenience and facility with which it may be assembled and it will also be obvious that my present invention is susceptible to some change or modification without material departure from the principles and spirit thereof, and for this reason, I do not wish to be understood as limiting myself to the precise arrangement and formation of the several parts herein shown, in carrying out my invention in practice, except as is defined by the scope of the claims appended hereto.

I claim:—

In a hose coupling, a clamping sleeve surrounding the end of the hose to be clamped and having an axial abutment projecting beyond the end of the hose, a coupling member adapted to abut the end of said hose, a rotatable collar positioned beyond the end of the hose and held against axial movement by said abutment and means carried by said collar for maintaining the said hose and coupling member in abutting relation.

The foregoing specification signed at Decatur, Ill., this 21st day of August 1916.

ERICH F. J. BREUER.

Copies of this patent may be obtained for five cents each, by addressing the "Commissioner of Patents, Washington, D. C."